Oct. 18, 1949.  W. J. COTTON  2,485,476
METHOD OF PRODUCING NITROGEN OXIDE
Filed July 27, 1944  5 Sheets-Sheet 1
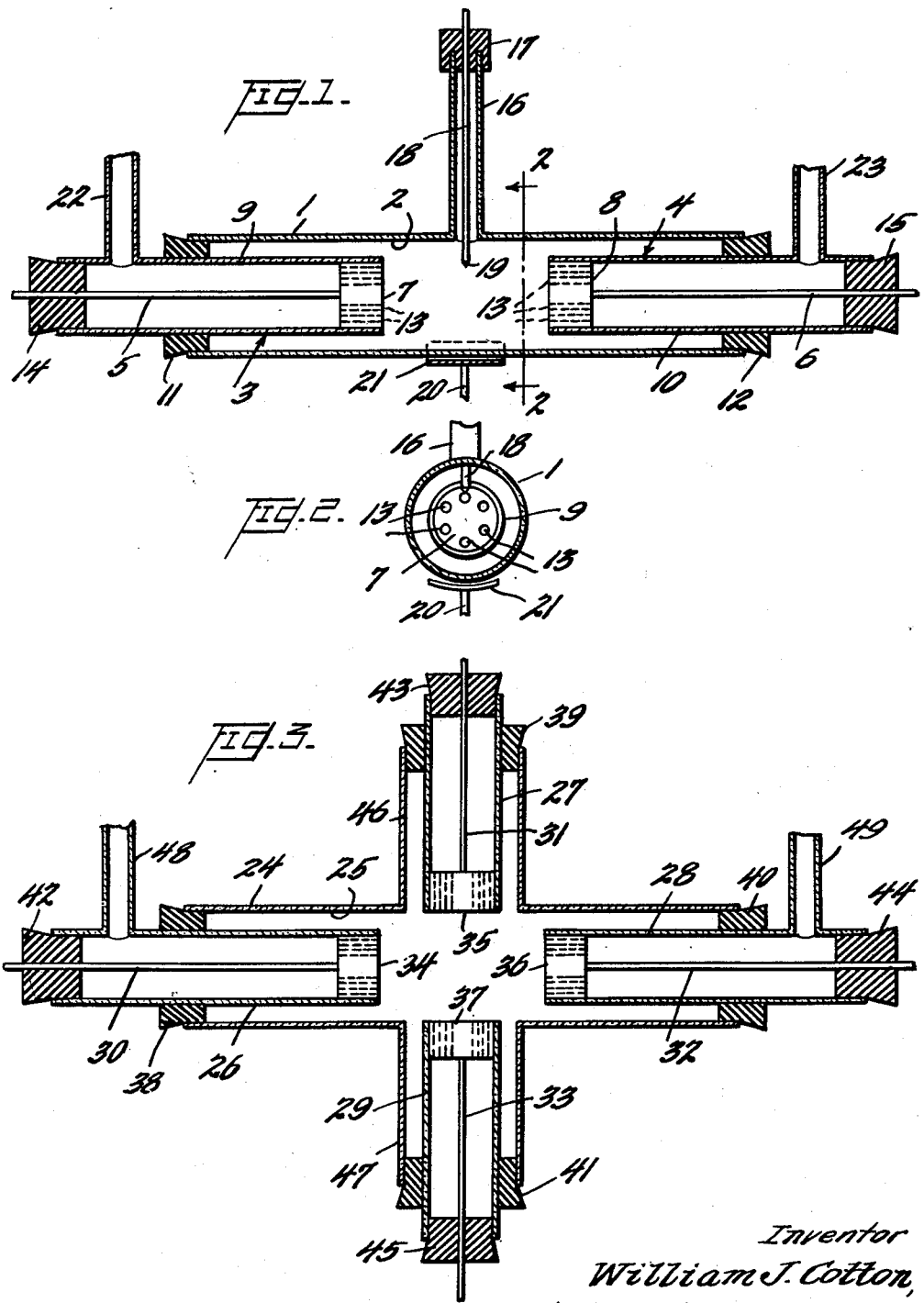
Inventor
William J. Cotton,
By [signature],
Att'y Oct. 18, 1949.　　　W. J. COTTON　　　2,485,476
METHOD OF PRODUCING NITROGEN OXIDE
Filed July 27, 1944　　　　　　　　　　　5 Sheets-Sheet 2
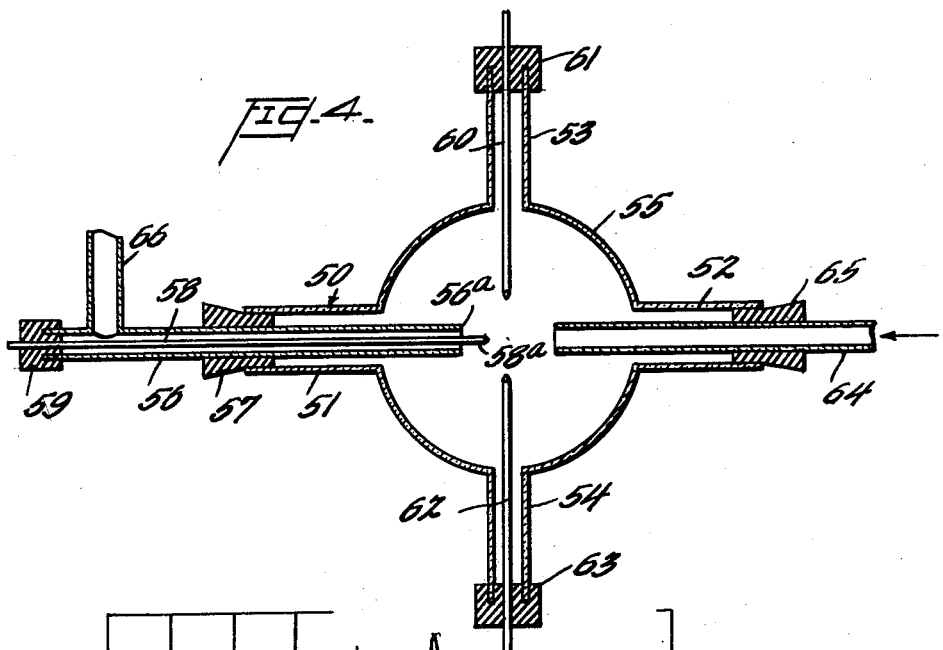
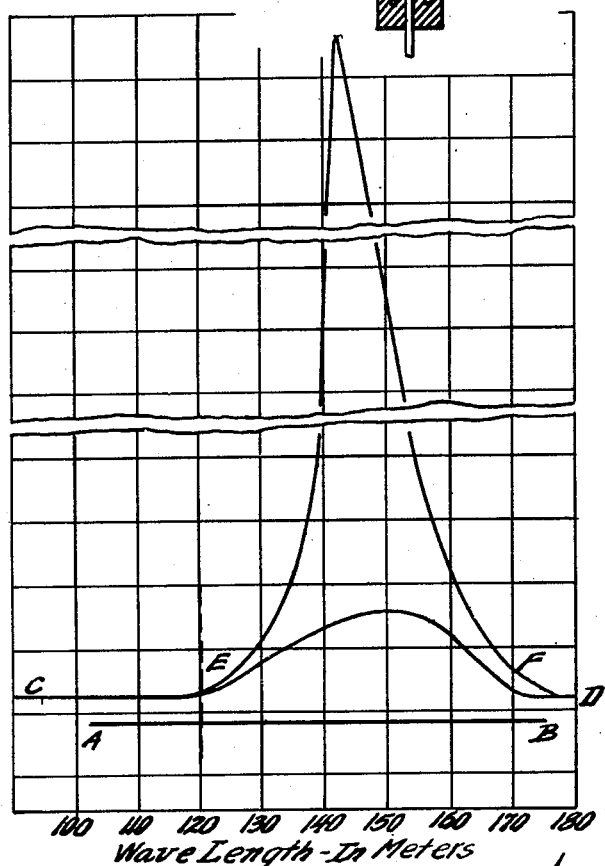
Inventor,
William J. Cotton Oct. 18, 1949. W. J. COTTON 2,485,476
METHOD OF PRODUCING NITROGEN OXIDE
Filed July 27, 1944 5 Sheets-Sheet 3
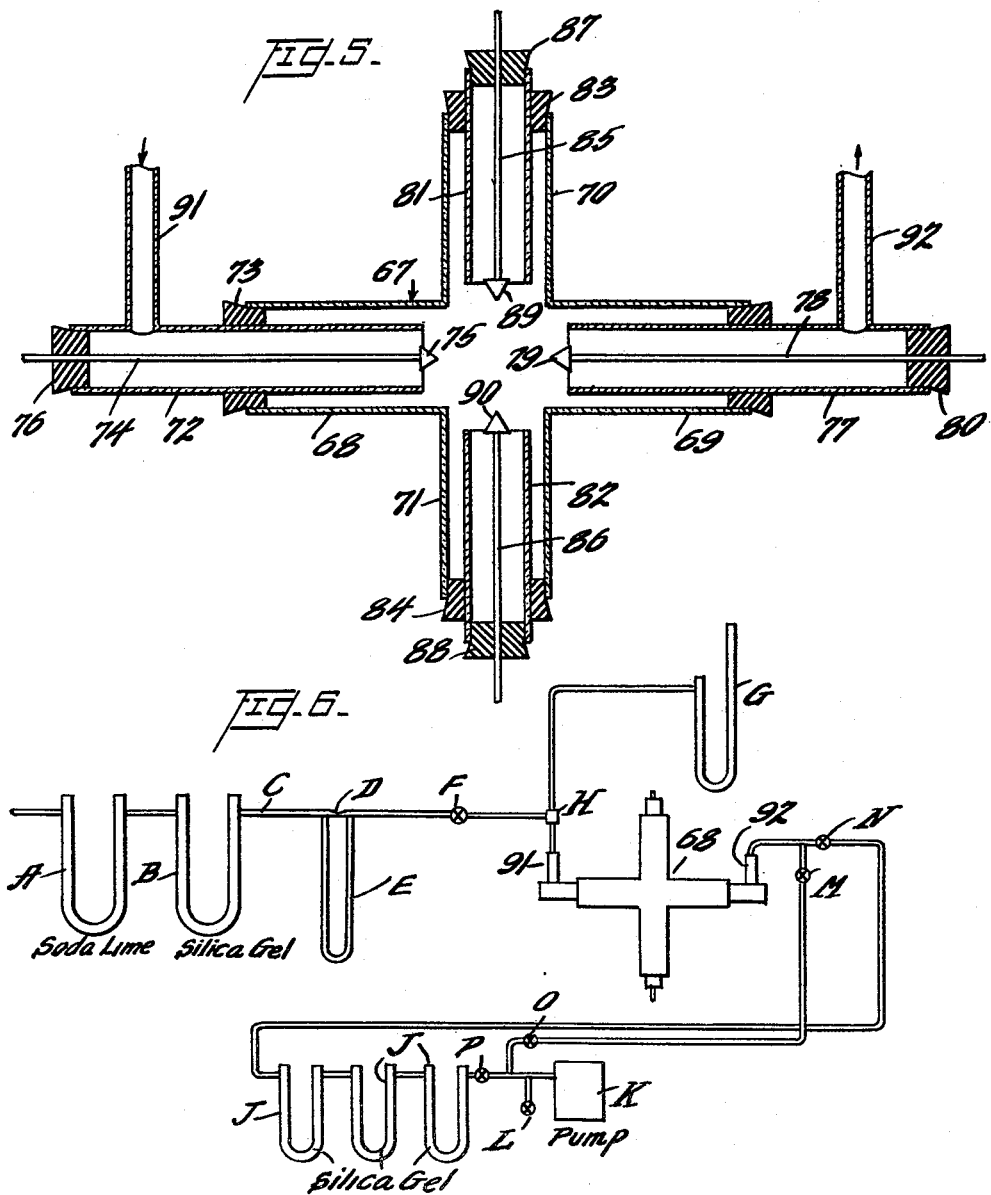
Inventor,
William J. Cotton
By Ivan P. Tashof,
Atty Oct. 18, 1949.   W. J. COTTON   2,485,476
METHOD OF PRODUCING NITROGEN OXIDE
Filed July 27, 1944   5 Sheets-Sheet 4
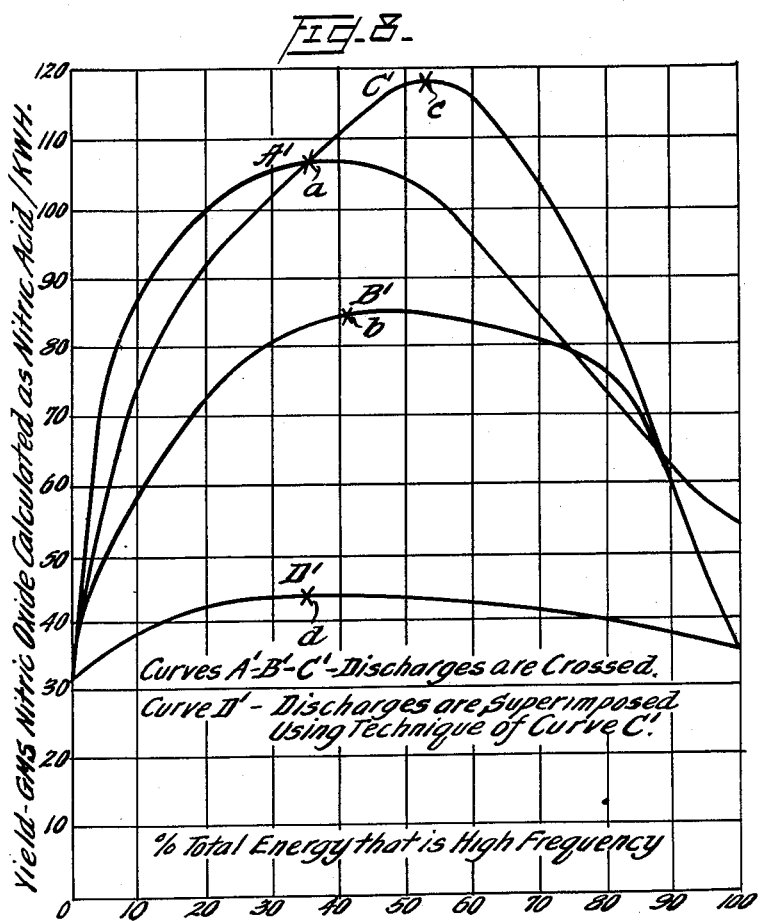
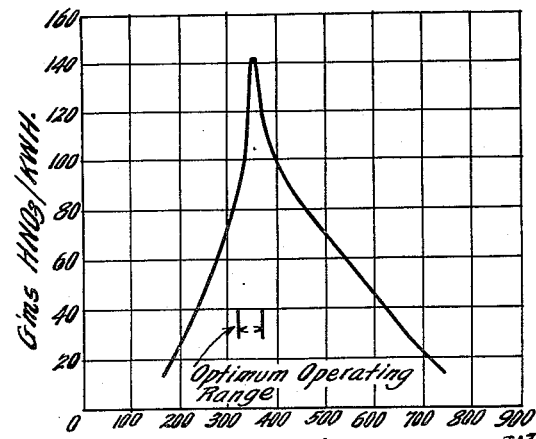

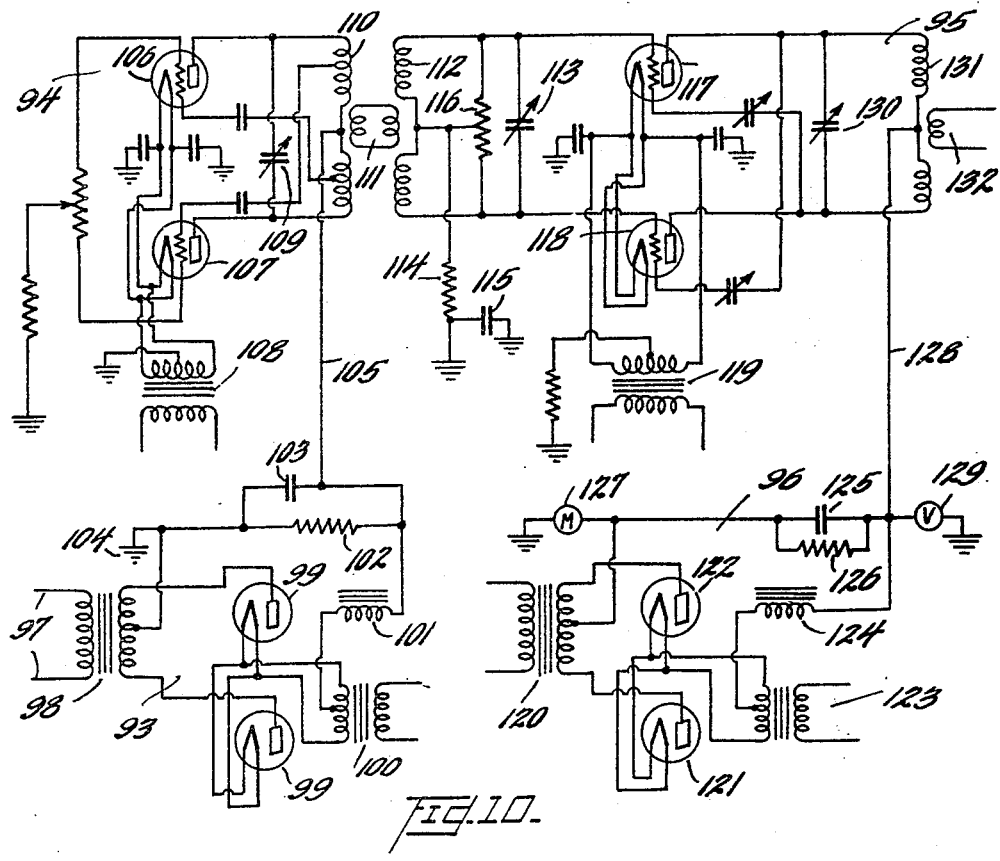
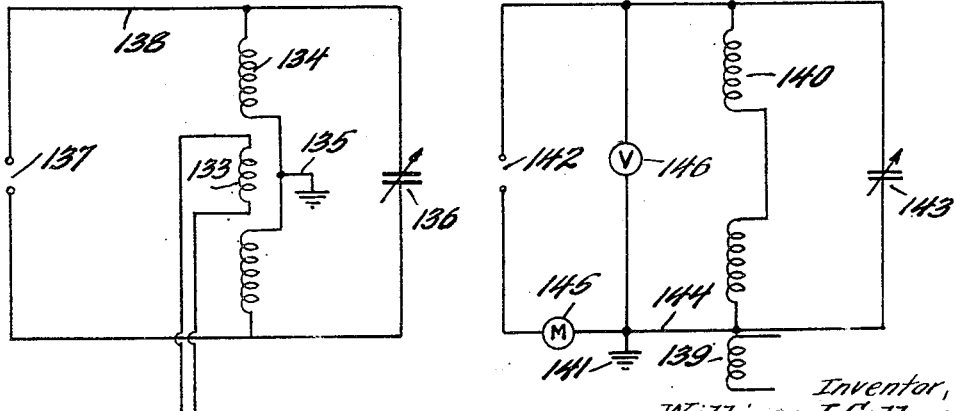

Patented Oct. 18, 1949

2,485,476

UNITED STATES PATENT OFFICE 2,485,476

METHOD OF PRODUCING NITROGEN OXIDE

William J. Cotton, Chicora, Pa., assignor, by mesne assignments, to Koppers Company, Inc., a corporation of Delaware Application July 27, 1944, Serial No. 546,882

15 Claims. (Cl. 204—179)

This invention relates to the chemical transformation of gaseous material by subjecting the same to the action of a plurality of crossed electrical discharges emanating from separately spaced electrodes supplied with cyclic electrical energy of substantially different frequencies. More specifically, the material to be treated is subjected to the action of a composite electric discharge generated by the simultaneous action of a plurality of discharges, one being a high frequency discharge and the other a low frequency discharge, said discharges being crossed, that is positioned at an angle one to the other.

By high frequency electrical energy, as used herein, is meant a cyclic and substantially sinusoidal electrical energy between the frequency limits of 0.2 megacycle (hereinafter referred to as mc.), and 30,000 mc. This corresponds to wave length limits of 1500 meters to one centimeter.

By low frequency electrical energy, as used herein, is meant cyclic and substantially sinusoidal electrical energy between the frequency limits of 10 cycles and 200,000 cycles. This corresponds to wave length limits of 30,000,000 meters to 1500 meters. Ordinary 60 cycle alternating current electrical energy is typical of what is meant by low frequency energy. Generally the low frequency energy is less than 1,000 cycles per second, and the high frequency energy is 300,000 cycles per second or greater.

This invention is more specifically directed to the production of nitrogen oxides, such as nitric oxide, although some aspects of the invention are broadly stated and broadly claimed, since the principles thereof are applicable in general to the electrochemical transformation of numerous materials in their gaseous state.

The principles of crossed discharges may be applied to effect a number of chemical reactions, including chemical combination, polymerization, dehydrogenation, oxidation, and the like. Organic compounds, such as aliphatic, aromatic or cyclic hydrocarbons, aldehydes, ketones, alcohols, esters, and acids, as well as nitrogen, sulphur, halogen or other substitution products and derivatives thereof, may be treated in accordance with the principles of the present invention to effect chemical combination, splitting or breaking down, transformation from saturated to unsaturated compounds or vice versa, hydrogenation and dehydrogenation, and many other chemical reactions.

More specifically, the present invention is admirably adapted for the production of nitric oxide, aldehydes, such as formaldehydes, or the oxidation of sulphur dioxide to sulphur trioxide, the condensation of ammonia to hydrazine, the oxidation of benzene to phenol, and the like.

It is clear from the above that the important feature residing in the use of crossed discharges in accordance with the methods herein set forth is that the two frequencies supplied to the crossed electrodes should differ substantially in numerical value one from the other. By the expression "substantial difference" in numerical value between the frequencies supplied is meant that this difference may be 200,000 cycles or more, since with this difference of frequency a substantial increase in yield is obtained. However, it is recognized that for some purposes the difference in frequencies may be somewhat smaller, as for example, 100,000 cycles or 150,000 cycles. Illustrating the critical difference in frequencies, it is within the scope of this invention to cross a high frequency discharge of 300,000 cycles with a low frequency discharge of 100,000 cycles. It is also within the scope of this invention to cross a high frequency discharge of 2.11 mc. with a low frequency discharge of 60-cycle. Again, it is within the scope of this invention to cross a high frequency discharge of 1.39 mc. with a high frequency discharge of 8.33 mc. The order of the difference is such that the crossed frequencies simultaneously acting on a chemical material and transforming said chemical material should, in the preferred form of the invention, produce an increase in yield of the final reaction product, calculated as grams of product per kilowatt (kwh.) of electrical energy, over the yield that would be produced in using either of the particular frequencies of the crossed discharge alone. The order of the frequencies is set forth by way of illustration and not by way of limitation as the important point is that the two frequencies supplied to the crossed electrodes should differ in numerical value one from the other as hereinbefore pointed out.

The present invention will be illustrated and the principles thereof set forth in connection with the production of nitric oxide, by subjecting a medium containing nitrogen and oxygen components adapted to produce nitrogen oxides upon being electrically subjected to the action of a plurality of crossed electrical discharges generated by separately spaced crossed electrodes supplied with energy components of substantially different frequencies.

Restating the above in slightly different language, it has been discovered that when the total electrically generated energy has, as a component thereof, a small amount of high frequency energy supplied to the high frequency discharge, the yield of the desired end product, defined as above, is greatly increased over that yield which is obtained by an equal amount of energy supplied by a relatively low frequency energy alone or by the high frequency energy alone.

It is an object of this invention to effect electrochemical transformation of gaseous material in a reactor provided with separately spaced crossed electrodes by subjecting said gaseous material to the action of a plurality of electrical discharges which cross each other and which emanate from said separately spaced electrodes each of said electrical discharges being generated by separate cyclic energy components of substantially different frequencies.

It is a further object to effect the transformation as above set forth using crossed electrical discharges generated by separate cyclic energy components differing in frequencies by at least 100,000 cycles per second.

Another object of the present invention is to effect the transformation as above set forth employing in one form of the invention a high frequency component which comprises about 6–8 per cent of the total energy supplied, and may range from 35 to 65 per cent of the total energy supplied, satisfactory results being obtained when the high frequency energy ranges from 45 to 55 per cent of the total energy supplied. It may be stated that there are many advantages present in carrying out the present invention when using a high frequency component which comprises less than 6–8 per cent of the total energy supplied, as hereinafter more fully pointed out, and, therefore, this disclosure should not be construed as limited to the transformation of gaseous material in the presence of crossed discharges when only about 6–8 per cent of the total energy supplied is high frequency energy.

It is a further object of the present invention to effect the electrochemical transformation of gaseous material in a reactor provided with separately spaced crossed electrodes by subjecting said gaseous material to the action of a plurality of discharges which cross each other and which emanate from the separately spaced electrodes, while maintaining the gaseous reaction mass in a relatively cold state, each of said discharges being generated by separate cyclic energy components of substantially different frequencies.

In one form of the invention the gaseous reaction mass is maintained at a temperature which inhibits decomposition of the electrically transformed gaseous material. The temperature of the reaction gas may be maintained between the temperature of the gaseous material prior to its introduction into the reactor, said temperature being around ordinary room temperature, as for example, 25–30° C., and below about 450° C. to 500° C., the temperature in one form of the invention being maintained between 25 to 35° C. and below about 200° C. The advantages and benefits of the present invention are adequate even though the reaction gas is maintained at higher temperatures, as for example, 500 to 750° C. or even greater, as for example 800 to 2,000° C. As the temperature increases, the benefits, including the yield, in most cases decreases.

The reaction may be carried out so that there is substantially little difference between the temperature of the gaseous material introduced into the reactor, the temperature during the period the electrochemical transformation is taking place, and the temperature of the electrically transformed product, or the gaseous mass containing the same which passes from the reactor after the reaction has been substantially completed.

Another object of the invention is to carry out the above set forth transformation utilizing a plurality of electrical discharges which cross each other, as for example at right angles, and which emanate from separately spaced electrodes, each of said discharges being generated by the minimum sustaining energy which will continuously maintain each of said discharges. This is merely the preferred method of carrying out the invention, since it utilizes a minimum amount of energy and the transformation under cold conditions insures a maximum yield.

However, the invention as herein set forth, both in its broad and preferred aspects, may be carried out utilizing discharges which are generated by energy exceeding the minimum sustaining energy which will continuously maintain each of the discharges, but under said circumstances there is a tendency to reduce the yield of the electrochemically transformed product. The luminous cross discharges generated from separately spaced electrodes, each set of which is supplied with separate cyclic electrical energies of substantially different frequencies, said discharges being generated at minimum sustaining energy or higher, should be continuously maintained in order to provide a maximum yield of the electrically transformed product, that is, any substantial fluttering of the discharges should be avoided as such fluttering tends to decrease the yield of the electrochemically transformed product. A small amount of fluttering is not a serious matter as the yield will not be materially decreased, but any substantial fluttering of the discharges will decrease the yield, and this decrease, in some instances, may be as much as 50%. By "fluttering" is meant the periodic partial extinction of one or both of the discharges, this being akin to the periodic extinction which is characteristic of the so-called "singing arc."

A further object of the present invention is to electrochemically transform the gaseous material utilizing a plurality of cyclic electrical discharges of the character herein set forth and simultaneously producing a composite visible luminous discharge having a volume larger than the volume of each of said discharges alone, when the energy to generate either of said discharges is equal to the total energy supplied to the electrodes generating said composite discharge.

It is another object of the invention to effect the electrochemical transformation of the gaseous material as herein set forth, while preferably maintaining the pressure within the reactor below about one half an atmosphere. This represents a preferred pressure, which in a sense is critical, as above this pressure, under the broad and preferred conditions herein set forth, the yield of the electrochemically transformed product begins to diminish.

In one form of the invention it is an object to effect the electrochemical transformation of gaseous material by subjecting the said material to the action of a plurality of electrical discharges which cross each othter and which emanate from separately spaced electrodes, each of said electrical discharges being generated by separate cyclic components differing in frequency by at least 200,000 cycles per second, at least one of said discharges being a silent discharge.

It is a further object of the present invention to produce nitrogen oxide utilizing the broad and preferred conditions set forth above. The nitrogen- and oxygen-containing gaseous medium which produces nitrogen oxide, as for example, nitric oxide, NO, upon treatment with crossed discharges, is introduced into the reactor and subjected to the action of a plurality of electrical discharges which cross each other, and which emanate from separately spaced electrodes, each of said electrical discharges being generated by separate cyclic energy components of substantially different frequencies, said difference being preferably at least 200,000 cycles. The higher frequency energy component comprises preferably at least 8 per cent of the total energy supplied, and this may vary as heretofore indicated.

It is another object to produce nitric oxide NO under the conditions hereinabove set forth, and the produce an effluent reactor gas having a nitric oxide concentration of at least two per cent by volume of the total mass of the reaction gas. This concentration may vary from 2 to 35 per cent, and even higher. This is a notable advance in the art. As far as is known, previous methods of electrochemically transforming air and similar nitrogen- and oxygen-containing gaseous media have never produced an effluent gas having the nitric oxide concentration of 2 per cent, and by the present invention the effluent gas may have 26 to 35 per cent of nitric oxide. One of the factors responsible for this high concentration of nitric oxide in the effluent gas is the step of effecting the transformation in the cold state, thereby inhibiting the decomposition of electrically transformed nitric oxide. Utilizing the arc processes and at high temperatures, up to 2000° C., the yields have been small, it is believed, in view of the high temperature employed, the latter preventing the formation of nitric oxide in substantial quantities or causing the decomposition of the nitric oxide after its formation, or both factors, may be responsible for the low yield of nitric oxide in the effluent reactor gases.

It is another object of the present invention to produce nitrogen oxide by introducing a gaseous medium, consisting principally of oxygen gas and nitrogen gas, into a gas discharge apparatus including a reactor, said apparatus being provided with a plurality of cyclic electrical discharges having different energy quanta and subjecting said gaseous medium to the action of a composite luminous electrical discharge produced by the intersection of at least two separate cyclic electrical discharges of different energy quantum, one of said discharges being generated by cyclic electrical energy having an energy quantum equivalent to a sinusoidal frequency between about 10 cycles (30,000,000 meters) and about 10,000 cycles (30,000 meters), and the other of said discharges being generated by cyclic electrical energy having an energy quantum equivalent to a sinusoidal frequency between about 100,000 cycles (3,000 meters) and about 300,000 mc. (1 mm.).

The present invention will be disclosed in connection with the accompanying drawing, in which Fig. 1 is a cross-sectional view of a suitable reactor apparatus capable of generating crossed discharges of the character herein described, said apparatus being provided with a high-frequency electrode external to the reactor vessel, and an additional high frequency electrode internal of the reactor vessel;

Fig. 2 is a transverse cross sectional view taken on the line 2—2 looking in the direction of the arrows in Fig. 1;

Fig. 3 is a cross sectional view of another suitable reactor similar to that shown in Fig. 1, in which both the high frequency electrodes are internal;

Fig. 4 is a cross sectional view of another modification of the reactor in which one electrode serves as a common ground;

Fig. 5 is a reactor similar to that shown in Fig. 3 wherein there are employed electrodes whose tips are pointed;

Fig. 6 is a diagrammatic representation of an apparatus for drying the air prior to its introduction into the reactor and for absorbing the nitric oxide content of the exit reaction gases;

Fig. 7 is a set of curves depicting the results obtained when using the reactor set forth in Fig. 1. The abscissa indicates wave lengths, lambda, in meters and the ordinate indicates the yield of nitric oxide calculated as gram of nitric acid per kilowatt hour.

The curve C—D represents the yields obtained with various wave lengths employing the reactor set forth in Fig. 1 and a high frequency discharge alone. The curve E—F represents the yield obtained with various wave lengths employing the reactor set forth in Fig. 1 and crossed discharges, one discharge being generated by a 60-cycle low frequency discharge, and the other discharge being generated by a high frequency discharge having a wave length corresponding with the abscissa.

Fig. 7 also sets forth a straight line A—B, which is intended to indicate the yield obtained using only 60-cycle low frequency energy.

Fig. 8 is a family of curves in which the curves A', B' and C' depict the results obtained by utilizing the reactor shown in Fig. 5 and the percentage of high frequency energy supplied is varied from 0 to 100%.

Fig. 8 also depicts as curve D', and shown here for purpose of comparison, the results that may be obtained when if instead of crossing the discharges they be superimposed one over the other using but one pair of electrodes;

Fig. 9 is a curve depicting the yield of nitric oxide calculated as grams of nitric acid per kilowatt hour when the high frequency energy supplied is maintained at a wave length of 120 meters or 2.5 mc., the low frequency energy is maintained at 60-cycles, and the pressure within the reactor being varied from 150 mm. of mercury to 725 mm. of mercury, said high frequency energy being 45 to 55% of the total energy supplied to the crossed discharges;

Fig. 10 sets forth the hook-up of the high frequency generator unit used for producing the high frequency energy supplied to the tank circuit connecting the generator and the reactor;

Fig. 11 sets forth the tank circuit used in Example 1, the run set forth in said example being carried out in the reactor shown in Fig. 1;

Fig. 12 sets forth the tank circuit used in Example 2, the run set forth in said example being carried out in the reactor shown in Fig. 5.

The reactor apparatus as shown in Fig. 1 comprises a hollow reactor vessel 1 having an interior wall 2, said reactor vessel being made of nonconducting or insulating material, such as a ceramic material, including glass, and preferably a high melting glass, as exemplified by borosilicate glass. Within the reactor vessel are positioned sheath tubes 3 and 4, provided with electrode leads 5 and 6, said leads having button-like electrode terminals 7 and 8, which are made of a good conducting material such as almost any metal or metal alloy. When an oxidation reaction is effected under the electrical discharges of the character herein set forth, the electrodes must resist oxidation.

The preferred material of the electrodes will depend to a substantial extent upon the minimum sustaining voltage required to maintain the crossed discharge, for the reason that the minimum sustaining voltage required, for pure metals, is a periodic function of the atomic number of said metal in the same manner as is almost all properties of the elements. Further, in the case of a binary alloy of two metals, the minimum sustaining voltage drops to a minimum after which it again rises as the composition of the alloy changes from 100% of one component to 100% of the other component. The electrode buttons or equivalent electrodes may consist of copper, copper alloys, silver, silver alloys, iron, iron alloys, nickel, nickel alloys, chromium, chromium alloys, tantalum, tantalum alloys, tungsten, or tungsten alloys. Among the specific alloys that may be used for electrode materials may be copper (98%)-lithium (2%), copper (98%)-beryllium (2%), lead (98%)-lithium (2%), lead (96%)-lithium (4%), zinc (98%)-lithium (2%), and zinc (93.4%)-lithium (6.6%). The tantalum and tantalum alloy electrodes are capable of withstanding exceedingly high minimum sustaining voltages without substantial oxidation. While tungsten is not suitable for oxidation reactions, it may be employed in reacting such chemicals or such compounds or mixture of compounds where oxidation is not present, for example when ammonia is condensed with itself to form hydrazine with the elimination of hydrogen.

The buttons 7 and 8 are mounted in sheaths 9 and 10 which are positioned centrally in the reactor vessel 1. These sheaths are mounted in and passed through air tight insulating closures 11 and 12 which may be of rubber, cork, or similar material. The button electrodes 7 and 8 are provided with a plurality of passageways 13 which function to split the reacting gaseous medium into a plurality of pencil-like streams, so as to better insure the contact of the gaseous medium being reacted with the crossed discharge. The outer ends of the sheaths 9 and 10 are respectively closed with tight insulating closures 14 and 15. The reactor vessel has sealed into its wall a tubular member 16 closed at its outer end with a closure member 17 which is perforated and through which there passes the high frequency electrode 18, which is made of any of the materials herein set forth. The reactor apparatus is preferably provided with an external electrode 20 having a terminal 21, said electrode being made of an electrically conducting material. Preferably the electrode terminal consists of a suitable metal, such as copper shaped to the contour of the reactor vessel 1 so as to preferably close an arc varying from 40° to 80° with the tip 19 of the internal electrode, said tip serving as a center of curvature. The external electrode terminal 21 is shaped and positioned to draw the discharge emanating from the electrode terminal tip 19 centrally downward between the button electrodes 7 and 8, thereby insuring maximum efficiency and yield. The external electrode terminal 21 may be placed in direct contact with the outer wall of the reactor vessel 1 but is preferably spaced at such a distance from the external wall of the reactor vessel as to minimize any heating of the wall. In practice, it has been found that, if the external terminal 21 is from 1 to 2 mm. from the external wall of the reactor vessel, satisfactory results are obtained.

It is desired to point out that the reactor set forth in Fig. 1 need not necessarily be mounted in the position shown, but it may be turned to any convenient angle and even inverted.

The gaseous material to be treated in accordance with the present invention, after being dried in the apparatus set forth in Fig. 6 and in the manner hereinafter described, enters through inlet member 22, passes through the sheath 9, the button electrode 7, and through the crossed discharge. The reaction product passes through the electrode terminal 8 and sheath 10, and leaves the reactor vessel by means of the exit conduit 23. The reaction product passes through a medium for extracting its nitric oxide content, the precise method of extraction being hereinafter set forth in connection with the description of Fig. 6.

It is desired to point out that for the button electrodes 7 and 8 there may be substituted sharpened or pointed electrodes of the character indicated in Fig. 5. When the electrode terminals are in the shape of sharpened points, the sheaths 9 and 10 may be omitted, but it is highly desirable to retain them in order to force the flow of a gaseous medium being subjected to the action of the crossed discharge in and around the electrode tips. Further, it is desired to point out that the sheaths 9 and 10 function to a large extent to protect the outer vessel 1 from the effect of heat that may be produced during the course of the reaction.

The following is a specific example, identified as Example 1, illustrating the production of nitric oxide from atmospheric air.

The diameter of the reactor vessel is 32 mm. The inner sheaths 9 and 10 are approximately 23 mm. in diameter. The overall length of the tube is 10". The flow of dried air is initiated through the inlet member 22, said air passing through the reactor vessel 1 at a velocity of 356 c. c. per minute standard condiitons. The pressure within the reactor vessel is maintained at 174 mm. of mercury. The electrode terminals 7 and 8 are spaced 60 mm. apart. There is applied to the low frequency electrode terminals 7 and 8 a voltage approximating 2160. This voltage alone will not strike a discharge, but the discharge will be initiated upon application of energy to the high frequency electrodes as indicated below. When employing a brass internal high frequency electrode 18 and a wave length of 142 meters, there is applied to the high frequency terminals 19 and 21 a voltage of about 2050. A wave length of 142 meters corresponds to a frequency of 2.11 mc. As soon as high frequency voltage has been applied to the high frequency electrodes, the high frequency discharge will strike and this will function to initate a striking of the low frequency discharge. Immediately upon the striking of the high frequency discharge its voltage drops to approximately 800 volts. Also when the low frequency discharge strikes, its voltage likewise markedly drops, in this particular example to 800 volts. Should either discharge fail to strike promptly, striking may be induced either by the use of a Lepel coil as a tickler in the usual manner or by readjusting more carefully the tuning of the tank circuit by means of the condenser therein as hereinafter pointed out. The current of the low frequency discharge approximates 128 milliamperes (ma.), while the current shown by the thermomilliammeter in the power amplifier plate circuit in the high frequency generator approximates 90 ma. The thermomilliammeter could have been inserted in the ground side of the high frequency discharge, and then the high frequency current can be read directly. The exit gases leave the reactor through the exit conduit 23, said exit gases consisting essentially of nitric oxide NO, of unreacted quantities of nitrogen and oxygen and traces of nitrogen dioxide $NO_2$ and nitrogen tetroxide $N_2O_4$.

The treatment and handling of the gas, both prior to its entry into the reactor and subsequent to leaving the same, is carried out as described in Example 2.

In Example 1 the low frequency electrode terminals consist of an alloy comprising approximately copper (98%) and lithium (2%). The exit gases of the character set forth pass with relatively high speed through the relatively short exit member to silica gel absorbers, where the nitrogen oxides are absorbed and the increase in weight noted, the specific apparatus for so doing being set forth in Fig. 6.

It is desired to point out that the time interval between the formation of the nitrogen oxides and their absorption by silica gel is only a small fraction of a second, so that of the total nitrogen oxides only a negligible amount is present as nitrogen dioxide $NO_2$ or nitrogen tetroxide $N_2O_4$. This is further indicated by the fact that the silica gel retains its almost white color. Particularly is this true in view of the fact that the reaction is carried out at the relatively low pressure of 174 mm. of mercury. This permits for purposes of calculation the assumption that all of the nitrogen oxides absorbed are present as nitric oxide NO.

The yield of nitric oxide calculated as nitric acid is calculated as follows:

$$\frac{\text{Wt. of nitric oxide (gms.)} \times \text{mol. wt. } HNO_3}{\text{Time (hrs.)} \times \text{mol. wt. } NO \times \text{ave kilowatts supplied to crossed discharge}}$$

Grams nitric acid per kilowatt hour

At the time that the curves of Fig. 7 were determined, a high frequency volt meter and thermomilliammeter were not available for inclusion in the tank circuit, and accordingly the readings of the voltmeter and thermomilliammeter in the power amplifier plate circuit were used as a basis for computing the energy supplied to the crossed discharge as high frequency energy. On this basis, the yield calculates to 78.0 grams nitric acid per kilowatt hour. Obviously, the energy assumed supplied as determined by these meters is too high, which means that the yield of 78.0 grams is too low. Subsequently, when meters became available and the efficiency of energy transfer from power amplifier plate to tank circuit could be determined and this factor applied as a correction factor, the yield as recalculated using this correction factor is 144.4 grams nitric oxide calculated as nitric acid per kilowatt hour.

It has been previously proposed, when producing nitric oxide with a high frequency discharge alone to measure yields of nitric oxide calculated as nitric acid by dividing the yield as indicated above by the power factor. Power factors that have thus been determined and used have ranged from approximately .98 for 60-cycle frequency to as low as .12 for a frequency of 10 mc. (30 meters). In calculating the yields of the present invention the power factor has been assumed as being 1.00. Had the power factor been actually determined and used in the calculation, the calculated yield would have been still further greatly increased. For instance, if for a yield of 1444.4 grams with a power factor of 1.00 for both the low and high frequency energy, the yield would be 676.8 grams per kilowatt hour when using a power factor of .98 for 60 cycles and .12 for the 2.11 mc. The point is that these various corrections are not necessary to demonstrate this invention as all the results obtained and set forth are on a rigorously comparable basis. Numerically they are extremely conservative.

It has been stated that the velocity of the air passing through the reactor vessel is about 356 c. c. per minute. It is important to supply to the reactor sufficient air per minute so that substantial maximum yield of the transformed product for the frequency used is obtained. It is necessary to determine empirically the proper velocity to be used for any given apparatus operated at any given frequency, since the minimum velocity which will produce substantially maximum yield of the transformed product depends on the reactor design, including the discharge gaps and the magnitude and frequency of the power supplied. It is obvious that in accordance with the low of mass action as applied to the curve of Figure 7 that the actual minimum velocity curve will have a contour which would be similar to and which would follow curve E—F of Figure 7. It is to be remembered that the velocity of flow of the material to be transformed through the reactor is critical only in the sense that it affects the yield obtained. If velocities lower or higher than the minimum critical velocity are used, all the advantages of the present invention are obtained, but the yield may be substantially less than it would have been if the preferred velocity or even a higher velocity were employed. In practice it is customary to employ a velocity of from 50 to 150 per cent in excess of the critical minimum velocity. It may be pointed out that if the velocity is increased 50 per cent over the minimum velocity, there is no corresponding 50 per cent increase in yield. On the other hand, if the velocity of passage through the reactor of the material being transformed is substantially decreased below the critical minimum value, then there is a substantial decrease in the yield, in accordance with the law of mass action. Not only does this relationship hold for crossed discharges of the character set forth, but it also holds when the gaseous material is subjected to the action of a high frequency discharge alone, that is when the high frequency discharge is not crossed with a low frequency discharge, said crossed discharges emanating from spaced electrodes.

In accordance with the present invention when using crossed discharges to treat a gaseous material for the purpose of transforming said material, the minimum critical velocity is necessarily greater when using frequencies corresponding with peak yields than when the frequency is much lower or higher than the critical frequency. This is all in accordance with the law of mass action. It is obvious that when operating along any of the base line frequencies there is a critical minimum velocity, and that when operating on the peak frequencies this critical velocity must be greatly increased.

Referring to Figure 7, there is shown therein the yields obtained using the reactor set forth in Figure 1. The curve E—F represents the yield obtained with wave lengths varying between 100 and 180 meters calculated without corrections as above indicated. These wave lengths correspond to a frequency varying from 3.0 mc. to 1.67 mc. This curve shows that under the operating conditions set forth in the above example the maximum yield was obtained at approximately 142 meters, which corresponds to a frequency of 2.11 mc. This yield peak was obtained when, of the total energy used, the high frequency energy approximates 45 to 50 per cent of the total energy supplied to the crossed discharges, the remainder being contributed by the low frequency component which was supplied at a frequency of 60-cycles per second. If the percentage of high frequency energy is decreased or increased, the peak yield is decreased, but the critical frequency for best yields at said amount of high frequency energy will remain at approximately 142 meters or 2.11 mc., but the yield will not be as great. Therefore, by maintaining all other operating conditions substantially constant and then varying either the wave length or the proportion of high frequency energy supplied to the crossed discharge, the yield may be varied, or both of these factors may be varied to vary the yield.

The discovery and utilization of critical frequencies in the electromechanical transformation of gaseous material is disclosed and claimed as a separate invention in the following copending applications of which the present application is a continuation-in-part: Serial No. 489,828, filed June 5, 1943; Serial No. 497,678, filed August 6, 1943; Serial No. 501,478, filed September 7, 1943; Serial No. 502,021, filed September 11, 1943; Serial No. 511,146, filed November 20, 1943; and Serial No. 526,933, filed March 17, 1944.

The above applications have become abandoned.

In Fig. 7 the curve C—D represents the yields obtained when using the high frequency discharge alone with wave lengths varying between 100 and 180 meters or frequency of 3 mc. to 1.67 mc. and in the reactor as set forth in Fig. 1.

The straight line A—B set forth in Fig. 7 is intended to indicate the yield obtained using a 60-cycle low frequency current in the reactor as set forth in Fig. 1.

The yield for curve C—D, when operating at 142 meter wave length, said curve being derived from the operation of a reactor apparatus using only high frequency energy, is 12.2 grams per kilowatt hour.

The yield indicated by curve E—F, at 142 meters resulting from the use of a crossed discharge of the character herein set forth, was 78.0 grams per kilowatt hour. When a low frequency discharge is used alone to produce nitric oxide under the operating conditions herein set forth, the yield is only 5.3 grams per kilowatt hour, as is indicated by the straight line A—B. The yields of 12.2 grams and 78.0 grams per kilowatt hour are subject to the same correction as hereinbefore noted. However, the important point, in relation to this invention, is that these figures show the relative advantage of working with a crossed discharge as compared with either a high frequency discharge alone or a low frequency discharge alone, over the entire frequency range of 100 to 180 meters.

Fig. 8, with equal clearness, sets forth the advantages of the crossed discharge using a high frequency component of 120 meters in a reactor as shown in Fig. 5 and varying the percentage ratio of the high frequency component to the low frequency component. Curve D' of Fig. 8 sets forth the comparable yields that are obtained if the various percentages of high and low frequency energy be superimposed on the same pair of electrodes.

The reactor apparatus set forth in Fig. 3 is similar to the reactor set forth in Fig. 1 except that all the electrodes are internal electrodes. Referring to Fig. 3 there is provided a hollow reactor vessel 24 having an interior wall 25, said reactor vessel being made of a non-conducting or insulating material of the character previously specified in connection with Fig. 1. Within the reactor vessel 24 are positioned sheath-like members 26, 27, 28 and 29 which enclose electrode leads 30, 31, 32, and 33 having button-like electrode terminals 34, 35, 36, and 37, respectively. These terminals may be made from any of the metals or alloys set forth in connection with Fig. 1. The sheaths 26, 27, 28, and 29 were respectively mounted in insulated closure members 38, 39, 40 and 41, and the exterior ends of the sheath members are closed by air tight insulating closures 42, 43, 44, and 45 respectively. The reactor vessel has sealed in its wall tubular extending members 46 and 47 which are preferably positioned at right angles to the horizontal member of the reactor vessel, although said extending members may be positioned at any other angle to the horizontally extending reactor vessel. In other words, the position of the members of the reactor vessel defines the position of the low frequency and high frequency crossed discharges. The reactor 24 is provided with inlet and outlet members 48 and 49.

The reactor unit shown in Fig. 4 comprises a reactor vessel 50 provided with horizontally extending members 51 and 52 and vertically extending tube-like members 53 and 54, all four of which project from the spherical member 55 and preferably lie in the same plane. Extending through the horizontal member 50 is a sheath-like member 56 which is mounted in an insulating closure member 57. Projecting within the sheath member 56 is a low frequency electrode 58, the latter being mounted in an insulating closure member 59. It also acts as a closure for the member 56. The electrode 60 is a high frequency hot terminal electrode. Projecting through the reactor member 54 is an electrode 62, the latter being mounted in an insulating closure member 63. The electrode 62 is the ground electrode for both the high frequency circuit and the low frequency circuit, serving as a common ground.

The gaseous medium enters through the inlet conduit 64 which is centrally mounted in the reactor member 52, the latter being provided with a closure member 65. It is to be noted that the inlet member 64 preferably extends well into the discharge volume in order to insure intimate contact of the entering gaseous medium with the crossed discharge. The reacted gaseous product passes first through the reactor sheath 56 and it leaves the reactor by the exit conduit 66. Both the high frequency electrodes and the low frequency electrodes may consist of any of the metals or alloys herein set forth or their equivalents known to the art. The high frequency gap may vary between 15 and 25 mm. and the gap between the low frequency electrodes and the ground electrodes may also vary between 15 and 25 mm. Obviously, this gap may vary according to operating conditions. Instead of arranging the electrodes as shown in Fig. 4, and of the three electrodes may be the ground electrode and the other two electrodes respectively become the high frequency electrode and the low frequency electrode, and these may be interchanged so that either one of them is the high frequency electrode of the low frequency electrode.

It is desired to point out that the electrode tip 58a projects beyond the end 56a of the sheath. Under some circumstances, this is a desirable construction, as this insures that the tip of the low frequency electrode is not subjected to the influence of any volatile constituents emanating from the interior wall of the sheath 56. If the sheath is made of glass it may emit active constituents, which may be sodium vapor or sodium ions. There is a tendency for the results to be non-uniform if the tip 58a is enclosed within the glass sheath. While it is stated that sodium may be responsible for this non-uniformity, it may be caused by other constituents of the glass.

The reactor unit set forth in Fig. 5 comprises a hollow horizontal member 67 provided with horizontal legs 68 and 69, respectively. The reactor is also provided with vertically extending reactor members 70 and 71.

Positioned within the horizontal reactor leg 68 is a sheath member 72 preferably made of glass, said sheath member being mounted in an insulating enclosure 73. Projecting through the reactor leg member 72 is an electrode 74 carrying a pointed electrode terminal 75. The electrode 74 is mounted in an insulating closure member 76. Positioned within the sheath 77 is a similar low frequency electrode 78 provided with an electrode tip 79. The outer end of the sheath carries an insulating closure 80 which functions as a mounting for the electrode 78. Positioned within the vertically extending reactor members 70 and 71 are glass sheath members 81 and 82 respectively, said members being mounted in airtight insulating closure members 83 and 84 respectively. Positioned within the sheathlike members 81 and 82 are the high frequency electrodes 85 and 86 which are respectively mounted in closure members 87 and 88.

The low frequency electrodes 74 and 78 and the high frequency electrodes 85 and 86 may be made of any of the materials set forth above in connection with Fig. 1.

It is within the province of the present invention to have the low frequency electrodes and the electrode terminals made of one material, such as copper, and the high frequency electrodes and the electrode terminals made of another material, such as nickel, to thereby provide electrodes and electrode terminals of different ion emission potentials. It is further within the province of the present invention to make each of the electrodes and the electrode tips of different conducting metals or alloys so as to provide electrode tips, each chosen to have its own selective ion emission potential.

Although, as shown in Fig. 5 electrodes 74 and 78 are the low frequency electrodes, the reactor may be constructed so that these electrodes are the high frequency electrodes and the remaining electrodes then become the low frequency electrodes.

As shown in Fig. 5 the crossed electrodes are all in the same plane and said plane may be a vertical plane, a horizontal plane, or any intermediate plane. It is within the province of the present invention to supplement the four electrodes as shown in Figure 5 by an additional pair of either high frequency or low frequency electrodes. The additional pair of low frequency may be the same low frequency passing therethrough as the frequency which passes through electrodes 74 and 78, or the frequency may be greater for the additional set of electrodes, or less than the frequency of the current passing through electrodes 74 and 78. The additional set of electrodes may be high frequency electrodes and the current passing therethrough may have a higher or a lower frequency than that passing through the high frequency electrodes 85 and 86. This arrangement may be called the "triple" discharge arrangement.

The following sets forth the results of what is herein termed, for the purpose of identification, Example 2. Example 2 represents point C' of Fig. 8.

The crossed discharge reactor set forth in Fig. 5 is provided with terminal electrodes comprising an alloy of approximately 98% copper in 2% lithium. The current passing through the low frequency electrodes 74 and 78 and electrode terminals 75 and 79 is 60-cycles per second. The current passing through the high frequency electrodes 85 and 86 and the electrode terminals 89 and 90 is 121 meters or 2.48 mc. The low frequency 60-cycle current uses 20 milliamperes at 600 volts. The 2.48 mc. high frequency current, 121 meters wave length, uses 19.3 milliamperes at 1000 volts. The high frequency current is measured by a thermomilliammeter in the ground side of the high frequency discharge. The electrode gap between the low frequency electrode terminals 75 and 79 is 29 mm. and the electrode gap between the high frequency terminals 89 and 90 is 22 mm. The total power supplied to the reactor is 26 watts. Of this the low frequency power is 12 watts and the high frequency power is 14 watts. Therefore, the high frequency power contributed 54% of the total energy.

Air is introduced to the inlet conduit 91 and passes into the sheath member 72, and then is subjected to the influence of the crossed discharge. The reaction product passes through the sheath 77 and out to the silica gel absorbers through the exit pipe 92. Air is supplied to the reactor at the rate of 444 cc. per minute calculated to standard conditions. The pressure maintained within the reactor throughout the run is 335 mm. mercury pressure.

The air is dried prior to its introduction to the reactor vessel 68 of Fig. 6 by passing it through the soda-lime tube A, then through the silica gel tube B, thence through the conduit C, through the orifice D of the differential manometer E, through the valve F, and thence to the reactor 68. At the point H is connected the mercury manometer G which measures the internal pressure of the reactor. From the reactor 68 the exit gases pass through exit conduit 92 to a series of silica gel absorption tubes J, which tubes extract the nitric oxide content of the exit gases. A vacuum is applied by means of the vacuum pump K and the amount of vacuum adjusted by means of the release valve L and the main valve F in the supply line. The soda-lime in tube A functions not only to take out a portion of the moisture, but also to extract from the air substantially all of the carbon dioxide. The air as delivered to the reactor 68 has a moisture content of about 5 to 8 mg. of moisture per liter. When the run is started, the valves N and P are closed and M and O are opened. When operation has reached equilibrium, valves N and P are quickly opened and valves M and O are closed, noting the time of doing so with a stop-watch. Upon conclusion of the run, valves M and O are opened and N and P are closed.

The time during which the valves N and P are opened to the absorbers and the valves M and O of the by-pass are closed is six minutes. During this period the silica gel is absorbing the nitric oxide produced by the reaction. After the run is terminated, the silica gel tubes are weighed and the increase in weight taken as the weight of nitric oxide produced in six minutes. In this example, there was produced, under the operating conditions above described for a period of six minutes, 147.3 mg. of nitric oxide. The yield on this data calculates to 118.9 grams of nitric acid per kilowatt hour. It should be noted that in calculating this result the power factor for both the high frequency and low frequency energy was assumed to be 1.00. Actually the power factor is appreciably lower, so that the results with the correct power factor would be very materially higher. For instance, if the power factor for the 60-cycle is .98 and the power factor for the high frequency component is .12, the calculated yield would be 590.8 grams of nitric acid per kilowatt hour based on the power actually consumed at the point of discharge. This compares with a thermodynamically calculated maximum variously calculated by different observers to lie between the limits of 2520 and 2580 grams per kilowatt hour. While, in this particular experiment, where the reaction pressure is less than one-half atmosphere, the gas is absorbed in the silica gel, when the pressure is in excess of one-half atmosphere the reaction gas may be passed, if so desired, into a balloon flask, where the gas is retained for a sufficient length of time to permit the nitric oxide content of the gas to be converted wholly to $N_2O_3$ and/or $N_2O_4$. From the balloon flask the gas may be drawn through an accurately measured volume of standardized caustic soda contained in bubble absorbers, and thereafter the excess of unreacted caustic soda titrated.

In Example 2 the concentration by volume of nitric oxide in the exit gases is 4.13%. This compares with concentrations obtained by the older electric discharge methods of from 1.0 to 1.8 per cent nitric oxide. The value of 4.13% is calculated in the following manner:

(1) The total volume of gas calculated to standard conditions passed through the reactor in six minutes at the rate of 444 cc. per minute is 2664 cc.

(2) There was obtained 147.3 mg. of nitric oxide. This, by elementary stoichiometric relations, is equivalent to 110.0 cc. nitric oxide gas, calculated to standard conditions.

(3) $\frac{110. \times 100}{2664} = 4.13\%$ nitric oxide gas in the exit gas from the apparatus.

Calculated by precisely the same procedure, the concentration by volume of nitric oxide in the exit gas of Example 1 is 26.5%.

In general, the concentration of nitric oxide in the effluent reactor gas may vary broadly from about 2 to 35 per cent by volume. The concentration of nitric oxide may vary in some cases from 4 to 26 to 27 per cent by volume.

Referring to Fig. 8, and the curves A', B', and C' therein set forth, it is to be noted that these curves show the advantages inherent in using crossed discharges. Percentages of high frequency energy varying from 0 to 100% are used, and the curves disclose that as the percentage of high frequency energy increases, the yield of nitric acid per kilowatt hour increases to a maximum at approximately 45 to 55% high frequency energy.

It is desired to point out that the high yield thus produced is approximately twice the yield obtained by the use of high frequency energy alone, and approximately 3 times the yield obtained by the use of low frequency energy.

It is desired to point out that in the runs set forth which furnish the data for the points on the curves set forth in Figure 8 the low frequency energy had a frequency of 60-cycles. In carrying out the present invention, it is not necessary to use only this frequency in combination with a significantly higher frequency energy. The principles of the crossed discharge are applicable to the use of crossed discharges which have substantial differences in frequency as has been specifically set forth above.

Curve D' of Figure 8 is for purposes of comparison. It shows the yields obtained calculated as grams of nitric acid per kilowatt hour, when the two frequency energies that are crossed in curves A', B' and C', are imposed over a single pair of electrodes. As in the case of curves A', B' and C', the ratio of high and low frequency energy supplied to the electrodes is given as the abscissa.

In this connection, reference is made to Fig. 7, wherein it is demonstrated that the advantages of crossed discharges shown for 2.5 mc. hold not only at that specific frequency but throughout the range from 2.5 mc. to 1.67 mc., or 120 meters to 180 meters. In general, it may be stated that using crossed discharges, one discharge being generated by low frequency energy of the character herein set forth and the other discharge being generated by high frequency energy, said cyclic energy components differing in frequency by at least 150,000 to 200,000 cycles per second, that the increase in yield may be obtained at all higher or lower frequencies, including those herein set forth, and is not limited to 120 meters to 180 meters or 2.5 mc. to 1.67 mc. The invention is basic in character and is not to be construed as limited to the specific combinations of high frequency and low frequency energy set forth. Various other combinations may be used and all the advantages resulting from the crossing of discharges will be obtained. Broadly, the invention resides in the step of crossing the discharges.

Referring to Fig. 9, it is to be noted that in Example 2 above described and in which the reactor apparatus of Fig. 5 is used, the pressure within the reactor is 335 mm. of mercury, as this gives the optimum yield. As the pressure is decreased or increased from this value, the yield decreases in accordance with the curve of Fig. 9. In obtaining this curve a frequency corresponding to a wave length of 121.0 meters was used. Also, the percentage of high and low frequency energy supplied was in the ratio of about 45 to 55 respectively. The electrodes or the electrode tips of the reactors herein set forth may be made of tantalum or tantalum alloys. The electrode tips of this material have the advantage that they have high melting points and do not oxidize at high temperatures. Where high temperatures are used it is advantageous to use tantalum electrodes and such electrodes may also be used even though the reaction mass is maintained in a cold state, as herein previously pointed out the temperature of the reaction mass being insufficient to oxidize tantalum or any other of a number of electrode materials.

On the passage of ammonia through reactors such as set forth in Figs. 1, 3, and 5, the internal electrodes of said reactors being provided with sharp nickel terminals, hydrazine $N_2H_4$ is produced when crossing a low frequency 60-cycle energy and a high frequency energy having a frequency varying between 15 mc. and 1.71 mc. or 20 to 175 meters. In this reaction, the ammonia is believed to dehydrogenate to yield the imino group, =NC, which group then combines with a second ammonia molecule to give hydrazine $N_2H_4$. So complete is the conversion of ammonia to imino group in the crossed discharge that, to get the best yields of hydrazine, it is necessary to feed fresh ammonia into the reactor gas stream just beyond the discharge space, that is between the discharge and the point of exit from the reactor. It has been found that the mixture of imine and hydrogen cannot be conducted any appreciable distance and the imine then combined with fresh ammonia.

A mixture of methane and air, in which the methane preferably greatly predominates, in passage through a reactor such as set forth in Fig. 1, produces formaldehyde. In the production of formaldehyde and other aldehydes the low frequency energy may have a frequency of 10, 25 or 60 cycles and preferably below 1000 cycles; and the high frequency energy may have a frequency of the character herein specified, including around 15 mc. However, the frequencies may vary broadly as herein set forth.

As an example of the application of the crossed discharge to reactions involving the use of heterocyclic compounds, pyridine may be set forth. Pyridine vapor is decomposed on its passage through the zone of a crossed discharge to produce aliphatic amines among other compounds. Pyridine may be hydrogenated in the presence of hydrogen to produce piperidine.

The lower members of the paraffin series, including methane, ethane, propane, butane and pentane, when passed through crossed discharges of the character herein set forth are dehydrogenated to yield mixtures of unsaturated hydrocarbons in varying proportions, depending upon the raw material used and the conditions of operation, said unsaturated hydrocarbons including such products as ethylene, acetylene and butene. If small amounts of water vapors be introduced with the hydrocarbon vapors, aldehydes will be produced.

Carbon dioxide may be passed through liquid benzene and the resulting gaseous mixture containing vapors of benzene may be passed through a zone of crossed discharge with the resulting production of benzoic acid, diphenyl and carbon black. Vapors of benzene passed through the crossed discharge give copious yields of diphenyl, carbon black and acetylene.

While excellent yields are obtained by passing organic compounds of the character above set forth through crossed discharges wherein both the high frequency discharge and the low frequency discharge are luminous discharges, the basic principle of the present invention may be applied when there is a luminous discharge between either the low frequency electrodes or the high frequency electrodes, the discharge between the other pair of electrodes being a silent discharge. Further, it has been found, that both of the component discharges may be of the silent discharge type without loss of the relative merits of the crossed discharge as compared with either the high frequency discharge alone or the low frequency discharge alone.

While in one form of the invention the electrochemical transformation of the gaseous material is effected by subjecting same to the action of a plurality of crossed luminous discharges emanating from separately spaced electrodes supplied with cyclic electrical energy of substantially different frequencies. It is within the province of the present invention to effect the transformation when using crossed silent discharges emanating from separately spaced electrodes supplied with separate cyclic energy components of substantially different frequencies.

Further, using the principles herein set forth, one of the discharges may be a luminous discharge and this may be crossed with a silent discharge. Illustratively, inorganic compounds may be reacted in the presence of hydrogen utilizing crossed silent discharges of the character herein set forth, or crossed silent discharges, or crossed discharges wherein one is a luminous discharge and the other is a silent discharge. Utilizing all or some of the above principles, both inorganic compounds or organic compounds may be electrochemically transformed, and this may be effected by the use of a luminous crossed discharge or by the use of a silent crossed discharge, or by the use of crossed discharges where one is luminous and one is silent. For example, not only nitrogen oxide may be produced using crossed discharges or combinations of crossed discharges of the kind above set forth, but sulphur dioxide may be oxidized to sulphur tri-oxide and similarly other inorganic reactions may be effected. Organic compounds may be reacted in the presence of various gases using a luminous crossed discharge or a crossed discharge where both discharges are silent and one is crossed. For example, methane on being subjected to the action of crossed silent discharges yields acetylene and hydrogen, together with carbon black, this being a dehydrogenation reaction.

The appearance and electrical characteristics of the luminous crossed discharge indicate that it cannot be classed as a glow discharge, or as an arc discharge, or as a corona discharge. It appears to be a new type of discharge distinct in its appearance and electrical characteristics from all other types of discharges heretofore reported. Its appearance may vary considerably without losing the advantages of the luminous crossed discharge. However, in its most effective form it appears somewhat as does a glow discharge in that a soft luminous light pervades the entire volume of the reactor between the electrode tips and the confining walls of the reactor and frequently appearing for as much as one-half to three-fourths of an inch behind the tips. Maximum luminosity is at the center of the crossed discharges, and it gradually decreases until the confining boundaries of the reactor are reached. In the case of the formation of nitric oxide from air this condition is reached at a pressure in the reactor of approximately 335 mm. mercury. With pressures higher or lower than this the discharge begins to show traces of stringy cores crossing between the two pairs of electrode tips and when this occurs the yields of product calculated as grams of nitric acid per kilowatt hour tend to fall off. Again in the preferred form, the crossed discharges are operated with a minimum sustaining energy and of this the high frequency component is preferably 45 to 55%. As the proportion of electrical components is increased or decreased beyond these limits, the discharge again begins to show the crossed stringy cores as indicated above and simultaneously the yields start to decrease to less than the maximum. The rate of flow of the air, if above the critical minimum previously discussed, does not appreciably effect the luminous or electrical characteristics of the discharge.

In the preferred form of the invention the luminous crossed discharge is a relatively cold discharge as is evidenced by:

(a) The exit gases are seldom more than four or five degrees in temperature higher than the gas entering the reactor. Where the crossed discharges are operated in conjunction with critical frequencies as set forth in a copending application, Serial No. 553,426, filed September 9, 1944, the difference in temperature between the entering and exit gases may not exceed more than a fraction of a degree and in certain cases there has frequently been an actual drop in temperature of the gas in passing through the crossed discharge zone.

(b) An optical pyrometer trained on the discharge volume through a quartz window in the reactor wall indicates a temperature, within the limits of accuracy of a pyrometer, substantially the same as for the entering gases.

(c) Metallic lithium melts at 186° C. A piece of metallic lithium cut to have sharp edges can be inserted into the discharge space as a probe or intermediate electrode without having its edges even slightly rounded.

The temperature limit of 186° C. is illustrative of the cold state in the reaction gas and is not to be taken as a definite limitation, as depending on the kind of reaction and the conditions of the reaction, higher temperatures may be used without effecting any substantial decomposition of the reaction product. Therefore it is not desired to be limited strictly to 186° C. or 200° C. as the upper temperature limit. The advantages from the standpoint of the yield may be obtained if the reaction temperature is maintained below 500° C.; and, viewing the invention in its broad aspect, material advantages can be gained by utilizing the present invention while maintaining the temperature much higher than 500° C., as for example, between 250° C. and 750° C., and, in many instances, the temperature can go considerably higher. This is illustrated by the oxidation of sulfur dioxide to sulfur trioxide. Sulfur trioxide is stable at temperatures even as high as 2000° and therefore it is not necessarily required to maintain the reaction gas at a temperature below 2000° C., although temperature control does offer other advantages. The present invention permits low temperatures to be used, and this would be of advantage in the sulfur dioxide oxidation as the reaction apparatus would not have to withstand 2000° C. Utilizing the principles of the present invention, the oxidation of sulfur dioxide to sulfur trioxide may be effected with excellent results at substantially room temperatures, that is, 25 to 30° C. It is within the province of the present invention to effect the oxidation of sulfur dioxide to sulfur trioxide at temperatures below 600° C.

In a reactor of the type set forth in Fig. 1 it has been frequently observed under conditions not exactly the preferred that the high frequency component emanating from the middle internal electrode may show a deep blue corona discharge, while surrounding it may be a soft luminous discharge emanating from the pair of low frequency electrodes. Even so, the yields appear to be excellent under these conditions although not quite as good as under the preferred conditions that have been set forth. By a slight adjustment to bring it into line with preferred conditions the corona disappears and the two discharges then melt into one another as a single soft luminous discharge.

In the example herein set forth the reaction is carried out below atmospheric pressure. However, it is within the province of the present invention to carry out the reactions using atmospheric pressure or super-atmospheric pressure.

It has been ascertained that air enriched with oxygen may be used for the production of nitric oxide, and, within limits, the yield will be somewhat increased over the yields which are herein set forth.

Fig. 10 sets forth the hook-up of the high frequency generator unit used for producing the high frequency energy supplied to the tank circuit connecting the generator to the reactor. The diagram may be divided into four circuits, 93, 94, 95 and 96. Circuit 93 is the full wave rectification unit wherein the leads 97 connect to the 110 volt 60-cycle supply on the panel board. The numeral 98 identifies a transformer delivering its secondary high voltage current to the two rectification tubes 99, the filaments of which are heated by current generated in the filament transformer 100. The resistor 102 and fixed condenser 103, together with a choke coil 101, constitute a filter. The high voltage D. C. current produced by this circuit leaves same by means of the ground connection 104 and the lead 105, which delivers to the plate of tubes 106 and 107 of the oscillator circuit. The transformer 108, connected with the 110 volt supply, provides the filament power for the tubes 106 and 107. The desired frequency is obtained by means of tuning the oscillator circuit 94, such tuning being effected by operation of the variable condenser 109 and the inductance 110.

In carrying out the work described as above set forth between the limits of wave lengths of 20 meters or 15 mc. and 175 meters or 1.71 mc., it is necessary to change the size of the inductance 110 by steps. This is done by removing one inductance and replacing same with another inductance having desired characteristics. The minor circuit 111 is a coupling circuit, coupling the oscillator and circuit 94 to the grid input circuit 112 of the power amplifier circuit 95. The grid circuit of the power amplifier is turned by means of the variable condenser 113 and by changing inductance coil 112 in a manner similar to the change effected in inductance 110, as necessary to meet requirements. The combination of resistor 114 and condenser 115, both of which are grounded, serve to minimize or eliminate parasitic oscillations that might render the output less monochromatic. The resistor 116 provides grid bias for the power amplifier tubes 117 and 118. The transformer 119 provides power for the filaments of the power tubes 117 and 118. These tubes amplify power provided by circuit 96, imparting thereto the frequency developed by oscillator tubes 106 and 107. Transformer 120, connected with a 110 volt supply, provides the energy to the power supply rectification tubes 121 and 122. Transformer 123, also connected with a 110 volt supply, provides the power for the filaments of tubes 121 and 122. It will be observed that circuit 96 is essentially similar to circuit 93. The combination of the choke 124, fixed condenser 125 and resistor 126 constitutes a filter. The rectified power leaves the circuit via the milliammeter 127 to ground and lead 128 to the power amplifier circuit 95. The voltage at which it is delivered is measured by the volt meter 129.

Meters 127 and 129 are accordingly the meters referred to in Example I as being in the power amplifier plate circuit and on which the early calculations were based. The power amplifier circuit 95 is tuned to the desired frequency as generated by means of oscillator tubes 106 and 107 of oscillator circuit 94 by means of a variable condenser 130 and the inductance 131. The inductance 131 is varied by means of changing coils to meet various wave length requirements as is done in the case of inductance 110 and 112. The power amplifier circuit 95 thus tuned and supplied by D. C. power from circuit 96 transmits the amplifier high frequency to the coupling circuit 132, which in turn delivers it to a tank circuit such as is shown in Fig. 11 or Fig. 12.

Fig. 11 sets forth a tank circuit of the type known as center grounded. It was used in all of the earlier work upon which the present application is predicated without either thermomilliammeter or high frequency volt meter being included as these instruments could not be procured at the time. Referring to Fig. 10, it should be noted that the portion of the coupling circuit there shown as 132 leads to and is a part of the coupling circuit 133 of Fig. 11. This coupling circuit 132—133 serves merely to transfer the high frequency energy from the generator set to the tank circuit proper. The tank circuit of Fig. 11 consists of the inductance 134 and is center grounded at 135 and the variable condenser 136. Point 137 in the circuit is the location of the high frequency discharge. The tank circuit is tuned to the frequency produced by the generator by use of the variable condenser 136 and by changing inductance coils 134, as was done with inductances 131, 112, and 110 to meet requirements. The circuit conductors 138 are preferably of copper tubing. Operation of the tank circuit is carried out by standard and well known procedures. This tank circuit was used in Example 1.

Fig. 12 represents a tank circuit of the type known as end grounded. It is the type of tank circuit used in later work as, for instance, Example II. The coupling circuit 139 in Fig. 12 serves the same purpose and is connected in the same manner as is the coupling circuit 133 of Fig. 11, except that it is placed at the end of the inductance 140 instead of in the center. It will be further noted that in this type of tank circuit the ground 141 is at the end of the tank coil 140 instead of in the middle, as shown in 135 in Fig. 11. The point 142 is the location of the discharge, as was the point 137 in Fig. 11. Tuning of this tank circuit to the generator circuit is carried out in a manner precisely the same as for the tank circuit shown in Fig. 11, namely, by means of the variable condenser 143 and by changing the inductance 140 to meet requirements. As in the case of Fig. 11, the circuit conductors 144 are preferably of copper tubing. When this type of tank circuit was used, instruments had become available so that a thermomilliammeter 145 was installed and a high frequency voltmeter 146. The data reported in Example 2 was read on these instruments and not on the corresponding power amplifier instruments as was the case in Example 1.

The striking voltages and the operating voltages across the high frequency and low frequency terminals are each set forth by way of illustration and not by way of limitation. Satisfactory results and yields are obtained irrespective of the voltages being high or low, or whether a Lepel tickler coil is used or is not used to assist in the striking of the discharge.

The gap between the high-frequency electrodes and the gap between the low-frequency electrodes are likewise set forth by way of illustration and not by way of limitation. The gaps in a pilot plant installation may be as long as 4 to 6 inches with a correspondingly increased voltage which may be as much as 2,500 volts but which in a fairly good sized reactor, capable of at least semi-commercial exploitation, may vary from 5000 to 30,000 volts, and desirably 10,000 to 20,000 volts. These voltages are applicable to the voltage of the high frequency current and the voltage of the low frequency current. Likewise the gaps in a full scale installation may approximate 10 to 14 inches or longer with correspondingly high voltages.

It is desired to point out, in connection with the crossed discharge, that there exists an interrelationship between minimum sustaining voltage, minimum sustaining energy, volume of the luminous discharge, the temperature of the discharge and the energy density. Without prejudicing this invention, it is believed that the peculiar and particular virtues of the crossed discharge are the result of a low energy density, lower than has heretofore been observed in any kind of a luminous discharge. By energy density is meant watts per cubic centimeter of luminous discharge. It is believed that this low energy density is achieved as a result of crossing the discharges in the manner described by this invention. It has been observed that, for instance, a 60-cycle low frequency discharge of approximately 60 watt energy content will occupy a liminous discharge volume of about one cubic centimeter. Hence in this case the energy density would approximate 60 watts per cc. On the other hand, for a high frequency discharge, operating at 120 meters wave length and at 60 watts energy, the volume of the luminous discharge will approximate three cc. In other words the energy density in this case approximates 20 watts per cc. Finally for a crossed discharge, of which 30 watts is supplied by 60-cycle low frequency energy and 30 watts by a 120 meter wave length high frequency energy, the volume of the luminous discharge will be in excess of 20 cc., so that in this case the energy density will be three watts or less per cc. If, now, the high frequency component selected should be a critical frequency as set forth in detail in copending application Serial No. 553,426, filed September 9, 1944, the energy density will be even less than three watts per cc. As an illustration of this, instead of using a high frequency component of 120 meters, a component of the critical frequency 142 meters wave length in this case of nitric oxide production be used, then the total visible volume of the crossed discharge will exceed 60 cc. In this case, therefore, the energy density will be less than one watt per cc. of luminous volume.

It is desired to point out that there apparently is little relationship between the observations of low temperature and low energy density of the discharge volume on the one hand, and the observations as to whether or not the electrode terminals glow brilliantly or do not glow at all. Columbium terminals always glow brilliantly regardless of operating conditions. Tantalum terminals usually exhibit a dull glow. Nickel, copper and copper lithium alloy terminals seldom glow under the preferred conditions.

It is desired to point out that minimum sustaining energy and minimum sustaining voltage are not necessarily the same thing. Operating at minimum sustaining energy there exists the possibility of utilizing higher voltage and lower amperage and also the possibility, without altering the total energy supplied, of operating at lower voltage and high amperage. In adjusting the power applied a constant minimum sustaining energy of both characters may be achieved. However, the combination of minimum sustaining energy made up of minimum possible voltage and the correspondingly higher amperage yields the better results and hence the specification of achieving minimum sustaining voltage accurately describes the preferred operating conditions.

It is also desired to point out in the light of the above noted energy density the high frequency discharge alone is relatively cold, as compared with the low frequency discharge alone, but the high frequency discharge is hotter than the composite discharge produced by crossing the low frequency energy and high frequency energy emanating from separately spaced electrodes, and this relationship is particularly true when the high frequency energy component of the energy generating the crossed discharge is a critical or resonant frequency, as more particularly pointed out in copending application Serial No. 553,426 filed September 9, 1944.

The conditions above set forth as regards discharge temperatures and energy densities are the preferred conditions to be achieved especially in the case of those reactions where the higher temperature tends to decompose the product formed. It is not intended that these preferred conditions serve as limitations as numerous benefits exist where higher temperatures are used, obtained by operating with more than minimum sustaining energies and with correspondingly higher temperatures such as 800 to 2000° C.

It was noted above that if the equipment were not properly adjusted, that the discharge would show stringy characteristics and that there would result a decrease in yield from the maximum that could be obtained with proper adjustment of the equipment. The proper adjustment to eliminate this condition consists primarily of two things: First, the tank condenser 143 may be readjusted after the approximate minimum sustaining voltage has been achieved and, second, the minimum sustaining voltage may again be adjusted after the final adjustment of the tank condenser 143.

It is desired to point out that the high frequency energy may be supplied from the standard high frequency tube form of generator as set forth above or that it may be supplied by the thyratron tube type of impulse generator in which the impulses have the same energy content as the "equivalent wave lengths" of sinusoidal waves. It is intended that the use of such an impulse type of generator, regardless of its repetition value, comes within the scope of this invention. This is more completely set forth in copending application Serial No. 526,933 covering the discovery of critical frequencies that result in peak yields.

In connection with the above it is well known that a specific sinusoidal wave length has a definite well known energy content, and that, given the particular wave length employed, the energy content or the energy quantum thereof can be easily calculated. The energy content of a given wave length in ergs may be obtained from the following formula:

$$E(\text{ergs}) = \frac{k}{\lambda}$$

where $$k = 1.967 \times 10^{-18}$$

and $$\lambda = \text{wave length in meters}$$

Utilizing the formula above, the electrical energy of the wave bands may be expressed in terms of ergs in the following manner:

For 120 meters:

$$E(\text{ergs}) = \frac{1.967 \times 10^{-18}}{120} = 1.639 \times 10^{-20}$$

Similarly, for 160 meters the energy in ergs equals $1.229 \times 10^{-20}$ ergs.

The electrical impulses that are not sinusoidal in form can be expressed by equating their energy content to the "equivalent wave length" of a sinusoidal wave. Therefore, the impulses emanating from an electrical impulse generator may be described in terms of equivalent wave lengths. Employing the terminology above set forth, the energy contents of the impulse, regardless of whether the impulse is sinusoidal or non-sinusoidal in character, may be described in terms of its energy content as measured in ergs.

It is within the province of the present invention to supply the energy quanta characteristic of either the high or low frequency component by any of the known methods of generating and supplying such quanta. The crossed discharges may be supplied by any devices generating substantially sinusoidal waves, as for example, by any of the standard forms of induction or electrostatic heating generators or by devices known generally under the name of electrical impulse generators. In order to indicate the equivalency of sinusoidal-generated energy and impulse-generated energy, the following example is given. When crossing a 60 cycle electrical discharge with a 2.50 mc. electrical discharge in the manner herein set forth, there is produced a crossed discharge in which the high frequency component supplies energy quanta of $1.64 \times 10^{-20}$ ergs, and the low frequency component supplies energy quanta of $3.93 \times 10^{-25}$ ergs.

It has been stated that in accordance with the present invention electrochemical transformation of gaseous material is effected, using crossed discharges where each of the discharges is generated by separate cyclic energy components of substantially different frequencies. Instead of stating that the discharges are generated by cyclic energy of substantially different frequencies it may be stated that discharges are generated by separate cyclic energy components differing substantially in their characteristic energy quanta. It has been stated that the order of the difference between the energy components should be at least 100,000 cycles per second. Expressing this in terms of energy quantum, the difference is $6.55 \times 10^{-22}$ ergs.

It has been further stated that one of the discharges may be generated by cyclic energy of a frequency less than 1000 cycles per second and the other discharge may be generated by cyclic energy of a frequency greater than 300,000 cycles per second. Stating this in terms of energy quantum, one of the discharges may be generated by cyclic energy of less than $6.55 \times 10^{-24}$ ergs, and the other discharge may be generated by cyclic energy greater than $1.96 \times 10^{-21}$ ergs.

It is within the province of the present invention to supply one pair of electrodes with substantially sinusoidal energy and cross the discharge generated thereby with the discharge generated by an impulse generator. Either discharge may be the high energy quanta. For example, a 60 cycle frequency discharge may be generated by a sinusoidal generator and this may be crossed with a discharge generated by an impulse generator delivering energy quanta of 2.50 mc. which may be equivalently expressed as a wave length of 120 meters.

It is to be understood that it is within the spirit of the present invention to subject gaseous material to the action of an electrical discharge generated by the simultaneous action of a plurality of discharges emanating from spaced electrodes, one being a high frequency discharge and the other a low frequency discharge, said discharges differing by 100,000 or more cycles per second.

The following are illustrative examples of suitable frequencies which may be crossed in accordance with the present invention:

25 cycles crossed with 1.39 mc., or 215 meters;
1000 cycles crossed with 1.05 mc., or 285 meters;
10 cycles crossed with 0.967 mc., or 310 meters;
60 cycles crossed with 25,000 mc., or 1.2 cm;
250 cycles crossed with 30,000 mc., or 1 cm;
100 cycles crossed with 1,000 mc., or 30 cm;
10,000 cycles crossed with 10,000 mc., or 3 cm;
200,000 cycles crossed with .4 mc., or 750 meters;
1 mc. crossed with 4 mc., or 75 meters.

As pointed out, in the preferred form of the invention it is desirable that the high frequency energy component comprise at least about 6–8 per cent of the total energy supplied, although for the highest yields the high frequency energy component may range from 35–65 per cent of the total energy supplied. It is not intended by the above to limit the present invention to the treatment of gaseous matter employing crossed discharges of the character set forth wherein the high frequency component comprises at least 6–8 per cent of the total energy supplied, as there are many advantages residing in the utilization of crossed discharges of the character set forth when the percentage of high frequency energy is lower than 6–8 per cent.

Referring to Figure 8, it will be noted that the use of even 1 to 2 per cent of high frequency energy produces a marked increase in yield, in fact the first per cent of high frequency energy produces greater increase in yield than does subsequent percentage increments of high frequency energy. Specifically, this will be clear from the examination of curves $a$, $b$ and $c$ of Figure 8. To illustrate the advantages that reside in using less than 8 per cent, referring to Figure 8 using 1 per cent of high frequency energy and crossed discharges, the yield approximates forty grams of nitric oxide, calculated as nitric acid, per kilowatt hour, as compared with approximately 32 grams using low frequency energy alone. In other words, there has resulted by the use of one per cent high frequency energy an increase of 25 per cent in yield over that which is obtained using the particular low frequency energy alone. Referring to curves $b$ and $c$, it is to be noted that the yield is greater using only 1 per cent of high frequency energy and crossed discharges over that yield which is obtained when using high frequency energy only. Even though the yield were not greater, the crossed discharges using 1 per cent high frequency energy offer a commercial advantage to the low cost of low frequency energy as compared with the high cost of high frequency energy. When effecting the electrochemical transformation of gaseous material by subjecting the same to the action of a plurality of crossed electrical discharges emanating from separately spaced electrodes supplied with cyclic energy of substantially different frequencies, namely high frequency energy and low frequency energy, substantial advantages from an operating standpoint are presented when using a half per cent, 1 per cent, 2 per cent, 3 per cent, 4 per cent, 5 per cent, 6 per cent, 7 per cent, or 8 per cent of high frequency energy. That is specific percentages are herein set forth to indicate that the present invention is not to be limited to 8 per cent of high frequency energy. However, at about 6 to 8 per cent of high frequency energy the technical advantage in terms of yield exceeds the yield that can be obtained with either low frequency energy alone or high frequency energy alone operating under any known conditions, as, for instance, the conditions represented by curve $a$. It is, therefore, clear that as the percentage of high frequency energy increases, there is a corresponding increase in yield, the maximum yield occurring when the high frequency component varies from about 35 per cent to 65 per cent of the total cyclic energy supplied to the system. The terms "low frequency energy" and "high frequency energy" as used in the above and in other discussions herein set forth, are to be interpreted in view of the definitions set forth in the present specification.

The method of producing nitrogen oxide employing certain of the frequencies herein set forth as claimed in applicant's co-pending application Serial No. 553,426, filed September 9, 1944. The utilization of these frequencies in the presence of an electrode in which copper predominates or in which nickel predominates is claimed in applicant's co-pending application Serial No. 99,815, filed June 17, 1949. The production of nitrogen oxide in the presence of certain of the herein set forth electrode materials is also claimed in co-pending application Serial No. 779,561, filed October 13, 1947 and in application Serial No. 790,568, filed December 9, 1947. Certain of the apparatus herein set forth is claimed in U. S. Patents Nos. 2,468,173, 2,468,174 and 2,468,175, all granted April 26, 1949.

What is claimed is:

1. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs.

2. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, that component which has the larger energy quantum being present to the extent of at least 8% of the total energy supplied to the composite discharge, each of said discharges having an energy quantum of less than $1.97 \times 10^{-16}$ ergs.

3. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs, and supplying the larger energy quantum to the gas discharge apparatus in an amount varying from 35% to 60% of the total energy supplied.

4. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges being generated by substantially the minimum sustaining energy which will continuously maintain said discharges, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs.

5. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge while maintaining the gaseous reaction product in a relatively cold state, said composite discharge being produced by the intersection of a plurality of separate cyclic electrical discharges differing in energy quantum, each of said discharges being generated by substantially the minimum sustaining energy which will continuously maintain said discharges, each of said discharges emanating from a separate high potential electrode terminal, and being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs.

6. The method of claim 1 in which the discharge is a visible discharge.

7. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite visible cold discharge which inhibits decomposition of the electrochemically produced nitrogen oxide, said composite cyclic electrical discharge being produced by the intersection of a plurality of separate cyclic electrical discharges differing in energy quantum, each of said discharges emanating from a separate high potential electrode terminal and being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs, said composite discharge having a volume larger than the volume of each of said discharges alone when the energy to generate each of said discharges is equal to the total energy supplied to the electrode generating said composite discharges.

8. The method of claim 1 in which the reaction is effected at a pressure below one half of an atmosphere.

9. The method of claim 1 in which one of the discharges is a silent discharge.

10. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, one of said discharges being generated by an energy quantum varying between the limits of $6.55 \times 10^{-26}$ ergs and $1.31 \times 10^{-21}$ ergs and the other discharge being generated by an energy quantum greater than $1.97 \times 10^{-21}$ ergs and less than $1.97 \times 10^{-16}$ ergs.

11. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, one of said discharges being generated by an energy quantum lower than $6.55 \times 10^{-24}$ ergs and the other discharge being generated by an energy quantum greater than $1.97 \times 10^{-21}$ ergs and less than $1.97 \times 10^{-16}$ ergs.

12. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium while maintaining the temperature of the same between about 25° C. and about 450° C., to the action of a composite cyclic electrical discharge produced by the intersection of a plurality of separate cyclic electrical discharges differing in energy quantum, each of said discharges emanating from a separate high potential electrode terminal, and being generated by cyclic electrical energy differing in energy quantum from each other by an amount lying between the limits of $6.55 \times 10^{-22}$ ergs and $1.31 \times 10^{-21}$ ergs, each of said discharges having an energy quantum of less than $1.97 \times 10^{-16}$ ergs.

13. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium while under a pressure varying between 150 and 725 millimeters of mercury to the action of a composite cyclic electrical discharge produced by the intersection of a plurality of separate cyclic electrical discharges differing in energy quantum, each of said discharges emanating from a separate high potential electrode terminal, each of said electrical discharges being generated by cyclic electrical energy differing in energy quantum from each other by at least an amount lying between the limits of $6.55 \times 10^{-22}$ ergs and $1.31 \times 10^{-21}$ ergs, each of said discharges having an energy quantum of less than $1.97 \times 10^{-16}$ ergs.

14. The method of producing nitrogen oxide comprising introducing a gaseous medium consisting principally of nitrogen gas and oxygen into a gas discharge apparatus having an assemblage of at least three separately spaced electrically-conducting electrodes provided with electrode terminals, two of said electrode terminals being high potential electrode terminals, said assemblage of electrodes being positioned to have a cyclic electrical discharge pass between a pair thereof, one of said pair being a low potential electrode, and subjecting said gaseous medium while under a pressure of about 335 mm. of mercury to the action of a visible substantially cold cyclic electrical discharge which inhibits substantial decomposition of the electrically transformed gaseous material, said discharge being produced by the intersection of a plurality of separate cyclic electrical discharges differing in energy quantum, each of said discharges being generated by substantially the minimum sustaining energy which will continuously maintain said discharges, each of said discharges emanating from a separate high potential electrode terminal, each of said electrical discharges being generated by cyclic electrical energy differing in energy quantum from each other by at least $6.55 \times 10^{-22}$ ergs, each of said discharges having an energy quantum of less than $1.97 \times 10^{-16}$ ergs, that energy component which has the larger energy quantum being present to the extent of at least 8% of the total energy supplied to the composite discharge.

15. The method of producing nitrogen oxide comprising introducing a gaseous medium consisting principally of oxygen gas and nitrogen gas into a gas discharge apparatus including a reactor provided with a plurality of cyclic electrical discharges having different energy quanta, and subjecting said gaseous medium to the action of a composite luminous electrical discharge produced by the intersection of at least two separate cyclic electrical discharges of different energy quantum, one of said discharges being generated by a cyclic energy equivalent to a sinusoidal frequency between about 10 cycles (30,000,000 meters) and about 10,000 cycles (30,000 meters) and the other of said discharges being generated by a cyclic energy quantum equivalent to a sinusoidal frequency between about 100,000 cycles (3,000 meters) and about 300,000 mc. (1 mm).

WILLIAM J. COTTON.

REFERENCES CITED

The following references are of record in the file of this patent:

UNITED STATES PATENTS

| Number | Name | Date |
|---|---|---|
| 1,055,331 | Kochmann | Mar. 11, 1913 |
| 1,458,525 | Daniel et al. | June 12, 1923 |
| 1,601,500 | Island | Sept. 28, 1926 |
| 2,064,260 | Herrmann | Dec. 15, 1936 |
| 2,106,780 | Whittier | Feb. 1, 1938 |

FOREIGN PATENTS

| Number | Country | Date |
|---|---|---|
| 12,541 | Great Britain | 1904 |
| 315,367 | Great Britain | 1930 |
| 504,048 | Great Britain | 1939 |
| 184,871 | Switzerland | 1936 |

OTHER REFERENCES

Helvetica Chemica Acta, volume 19, (1939), pages 1074–1079.